(12) United States Patent
Steinbrink et al.

(10) Patent No.: US 9,029,702 B2
(45) Date of Patent: May 12, 2015

(54) CONNECTION ASSEMBLY FOR A SENSOR ASSEMBLY AND SENSOR ASSEMBLY

(75) Inventors: Ronald Steinbrink, Erfurt (DE); Sven Kluge, Eisenach (DE); Stefan Ortmann, Schwarzhausen (DE); Steffen Schulze, Eisenach (DE); Daniel Matthie, Eisenach (DE); Jens Liebetrau, Mihla (DE); Frank Weishaeutel, Wangenheim (DE); Jan Beyersdorfer, Foertha (DE)

(73) Assignee: Robert Bosch GmbH, Stuttgart (DE)

( * ) Notice: Subject to any disclaimer, the term of this patent is extended or adjusted under 35 U.S.C. 154(b) by 530 days.

(21) Appl. No.: 13/392,675

(22) PCT Filed: Jul. 5, 2010

(86) PCT No.: PCT/EP2010/059555
§ 371 (c)(1),
(2), (4) Date: Apr. 26, 2012

(87) PCT Pub. No.: WO2011/023439
PCT Pub. Date: Mar. 3, 2011

(65) Prior Publication Data
US 2012/0198933 A1  Aug. 9, 2012

(30) Foreign Application Priority Data
Aug. 28, 2009 (DE) .......................... 10 2009 028 963

(51) Int. Cl.
*H02G 15/02* (2006.01)
*G01D 11/30* (2006.01) *G01D 11/24* (2006.01)
*G01P 1/02* (2006.01)

(52) U.S. Cl.
CPC .............. *G01D 11/30* (2013.01); *G01D 11/245* (2013.01); *G01P 1/026* (2013.01)

(58) Field of Classification Search
CPC ............................ H02G 15/013; H02G 15/04
USPC ................................................ 174/74 R, 84 C
See application file for complete search history.

(56) References Cited

U.S. PATENT DOCUMENTS

| 3,953,058 A | 4/1976 | Soblesky |
| 2002/0125984 A1 | 9/2002 | Muziol et al. |
| 2007/0169544 A1 | 7/2007 | Yamamoto et al. |

FOREIGN PATENT DOCUMENTS

| CN | 100473984 C | 4/2009 |
| DE | 196 18 631 A1 | 11/1997 |

(Continued)

OTHER PUBLICATIONS

International Search Report corresponding to PCT Application No. PCT/EP2010/059555, mailed Apr. 15, 2011 (German and English language document) (5 pages).

*Primary Examiner* — Chau N Nguyen
(74) *Attorney, Agent, or Firm* — Maginot, Moore & Beck LLP

(57) ABSTRACT

The disclosure relates to a connection assembly for a sensor assembly having a connection element which is electrically and mechanically connected to one end of at least one wire of a connection cable in a first contacting region and can be electrically and mechanically connected to a sensor element in a second contacting region, wherein the connection element is at least partially enclosed by a plastic overmold which has a window-shaped recess in a transition region between the first contacting region and the second contacting region which is sealed in the injection molding die during the injection process of the plastic overmold and a corresponding sensor assembly. According to the disclosure, a positioning opening is arranged in the transition region such that the connection element can be positioned in the injection molding die and the transition region surrounding the positioning opening is sealed flat in the injection molding die to create the window-shaped recess.

10 Claims, 3 Drawing Sheets

(56) References Cited

FOREIGN PATENT DOCUMENTS

| | | |
|---|---|---|
| DE | 10 2005 012 709 A1 | 9/2006 |
| JP | 7-20100 A | 1/1995 |
| JP | 2000-508068 A | 6/2000 |
| JP | 2008-533494 A | 8/2008 |
| JP | 2010-521695 A | 6/2010 |
| RU | 2 292 528 C2 | 7/2004 |
| SU | 1530646 A1 | 12/1989 |
| WO | 02/095335 A1 | 11/2002 |
| WO | 2008/113312 A1 | 9/2008 |

CONNECTION ASSEMBLY FOR A SENSOR ASSEMBLY AND SENSOR ASSEMBLY

This application is a 35 U.S.C. §371 National Stage Application of PCT/EP2010/059555, filed on Jul. 5, 2009, which claims the benefit of priority to Serial No. DE 10 2009 028 963.1, filed on Aug. 28, 2009 in Germany, the disclosures of which are incorporated herein by reference in their entirety.

BACKGROUND

The disclosure is based on a connection assembly for a sensor assembly, and on a corresponding sensor assembly.

Laid-open specification DE 10 2005 012 709 A1 describes, for example, a magnetic field sensor, in particular a rotation speed and/or direction of rotation sensor for a vehicle wheel or for the drive train of a vehicle. The described magnetic field sensor has a holder for a sensor element and possibly further sensor components. The holder is designed as an injection-molded plastic part and has a pocket-like cutout in the region of its read-side end face, in which end face the sensor element is supported at least in the direction of the injection pressure during final extrusion with plastic, and is therefore protected against mechanical damage. A connection assembly for the described magnetic field sensor has a connection element which has two connection pieces in a first contact-making region, said connection pieces each being electrically and mechanically connected to the stripped ends of a connection cable by means of a crimped connection. The connection pieces can be electrically and mechanically connected to connection lines of a sensor element in a second contact-making region. The connection element is at least partially encased by a plastic extrusion coating which has a window-like cutout in a transition region between the first contact-making region and the second contact-making region, said cutout being sealed off during the injection process for the plastic extrusion coating in the injection-molding die. These connection pieces are initially in one piece before the injection process, in order to make it easier to position the connection element, and are then electrically insulated from one another by separating the connecting parts.

A connecting web, which is present between the crimped connections, is bent generally after the crimping of individual cores and before the injection operation such that the two crimped connections of the individual cores are closer to one another. The relatively large spacing before the crimped connections are established is required since the crimping lugs are bent out of the material of the connection element which is designed as a stamped strip. However, the connection pieces of the magnetic field sensor should be closer to one another for the purpose of making subsequent contact with the sensor element. The edges of the bent connecting web between the two crimped connections have to be sealed off by an unfavorably stepped sealing in the injection-molding die, but as a result are difficult to position, this possibly leading to increased wear of the die or to overflowing. Overflowing can, in turn, have an unfavorable effect on subsequent processes, for example on a resistance-welding process for the purpose of making contact with the sensor element.

SUMMARY

In contrast, the connection assembly according to the disclosure has the advantage that a positioning opening is arranged in a transition region between a first contact-making region and a second contact-making region such that the connection element can be positioned in the injection-molding die, and the transition region, which surrounds the positioning opening, in the injection-molding die for producing a window-like cutout in a plastic extrusion coating is sealed off so that it is flat. The connection element can advantageously be positioned in the injection-molding die in a simple and rapid manner by virtue of the positioning opening. In addition, the flat sealing of the transition region in the injection-molding die advantageously prevents overflowing which can have a disadvantageous effect on subsequent processes. The flat sealing in the transition region can be achieved, for example, by requisite bending edges of the connection element being positioned within the plastic extrusion coating and therefore outside the window-like cutout. In addition, existing transitions between different contact-making planes are connected to one another by sloping surfaces and not by vertical steps, in order to allow flat sealing in the injection-molding die.

The connection assembly according to the disclosure describes a precursor for the production of a sensor assembly, in particular for measuring rotation speeds and/or rotation directions, which precursor is electrically and mechanically connected to at least one end of a core of a connection cable by means of a connection element in the first contact-making region and can be electrically and mechanically connected to a sensor element in the second contact-making region in a further manufacturing step. The connection element is designed, for example, as a stamped part and is at least partially encased by the plastic extrusion coating during an injection process after being connected to the connection cable, said plastic extrusion coating having a window-like cutout in the transition region, said cutout being sealed off during the injection process for the plastic extrusion coating in the injection-molding die. The window-like cutout is used in the further manufacturing step in order to electrically and mechanically connect the second contact-making region to the sensor element.

The measures and developments described herein allow advantageous improvements to the connection assembly.

It is particularly advantageous for the transition region to be designed, in order to bridge an existing height difference which is produced by the first contact-making region and the second contact-making region being arranged in different planes, as a sloping plane in which two transition webs laterally delimit the positioning opening. The design of the transition region as a sloping plane advantageously allows for a flat sealing during the injection process, even though a height difference between the two contact-making regions has to be bridged.

In a refinement of the connection assembly according to the disclosure, two first connection pieces are arranged in the first contact-making region, said connection pieces being connected to one another by means of a first connecting web, with the first connecting web delimiting the positioning opening at one end. The first connecting web advantageously allows for a one-piece design of the connection element, with the result that the positioning and the handling are made easier during the injection process.

In a further refinement of the connection assembly according to the disclosure, two second connection pieces are arranged in the second contact-making region, said connection pieces being connected to one another by means of a second connecting web, with the second connecting web delimiting the positioning opening at the other end. The second connecting web further increases the rigidity and stability of the one-piece connection element, with the result that the positioning and the handling are further improved during the injection process.

In a further refinement of the connection assembly according to the disclosure, a first transition web connects a first connection piece to a corresponding second connection piece, and a second transition web connects another first connection piece to another corresponding second connection piece. This means that the first connection pieces are in each case connected to a corresponding second connection piece by means of the transition webs which laterally delimit the positioning opening.

In a further refinement of the connection assembly according to the disclosure, the first connecting web and/or the second connecting web are severed after the injection process in order to separate the two first connection pieces and/or the two second connection pieces from one another. This creates two signal paths which are electrically insulated from one another and by means of which the sensor element can be connected to the connection cable.

In a further refinement of the connection assembly according to the disclosure, the electrical and mechanical connection between the first connection pieces and in each case one end of a core of the connection cable is made in the first contact-making region by means of a crimped connection or a soldered and/or welded connection. The crimped connection between the first connection pieces and in each case one end of a core of the connection cable can be established, for example, by first connection pieces which are designed as a crimping lug or by additional crimping elements. The first connection pieces which are designed as a crimping lug are bent after the respective crimped connection is established, with the respective bending region being arranged outside the sealing region for producing the window-like cutout. The arrangement of the bending region outside the sealing region advantageously allows for flat sealing in the injection-molding die.

The connection assembly according to the disclosure can be used for a sensor assembly having a sensor element, in particular for measuring the rotation speed and/or the direction of rotation.

Exemplary embodiments of the disclosure are illustrated in the drawings and will be explained in greater detail in the following description.

DETAILED DESCRIPTION

Throughout the appended FIGS. 1 to 6, identical reference symbols denote elements or components which execute identical or analogous functions.

Figure 1:
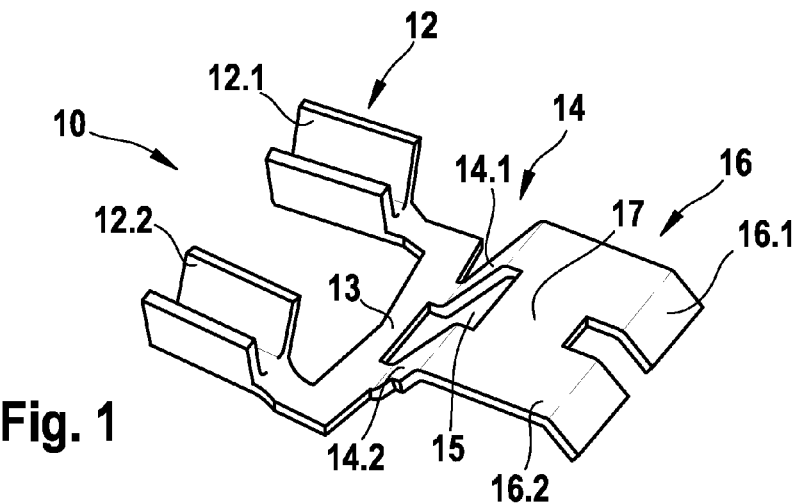
FIG. 1 shows a schematic perspective view of a first exemplary embodiment of a connection element for a connection assembly according to the disclosure for a sensor assembly.
Figure 2:
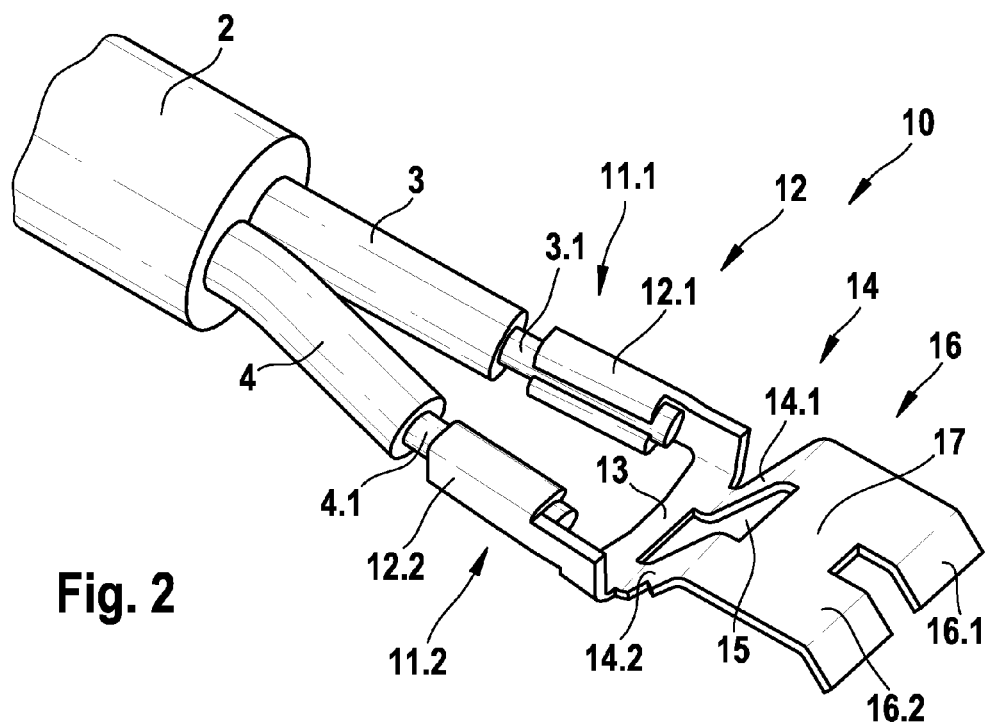
FIG. 2 shows a schematic, perspective view of the first exemplary embodiment of the connection element from FIG. 1 which is electrically and mechanically connected to a connection cable.

FIGS. 1 and 2 in each case show a schematic, perspective view of a first exemplary embodiment of a connection element 10 for a connection assembly 1 (illustrated in FIGS. 3 and 4) according to the disclosure for a sensor assembly. In said figures, FIG. 1 shows the connection element 10 before it is connected to a two-core connection cable 2, and FIG. 2 shows the connection element 10 after a double crimped connection 11.1, 11.2 to the two-core connection cable 2 has been established.

As can be seen in FIG. 1 or 2, the first exemplary embodiment of the connection element 10 comprises two first connection pieces 12.1, 12.2, which are designed as crimping lugs and are connected to one another by means of a first connecting web 13, in a first contact-making region 12. As can be seen in FIG. 2 in particular, the two first connection pieces 12.1, 12.2 are electrically and mechanically connected in each case to a stripped end 3.1, 4.1 of a core 3, 4 of the connection cable 2 by corresponding crimped connections 11.1, 11.2 in the first contact-making region 12. In a second contact-making region 16, the connection element comprises two second connection pieces 16.1, 16.2 which are connected to one another by means of a second connecting web 17. In the second contact-making region 16, the two second connection pieces 16.1, 16.2 can be electrically and mechanically connected to a sensor element (not illustrated) in a further manufacturing step. A positioning opening 15 is arranged in a transition region 14 between the first contact-making region 12 and the second contact-making region 16, said positioning opening being laterally delimited by two transition webs 14.1, 14.2, with a first transition web 14.1 connecting a first connection piece 12.1 to a second connection piece 16.1, and a second transition web 14.2 connecting the other first connection piece 12.2 to the other second connection piece 16.2. As a result, two electrically separate signal paths by means of which the sensor assembly (not illustrated) can be electrically coupled to the connection cable 2 can be created by separating the first connecting web 13, which delimits the positioning opening 15 at one end, and the second connecting web, which delimits the positioning opening 15 at the other end.

As can further be seen in FIGS. 1 and 2, the first contact-making region 12 and the second contact-making region 16 of the connection element 10 are arranged in different planes, with the transition region 14 being designed, in order to bridge the existing height difference, as a sloping plane. The connection element 10 is designed, for example, as a stamped part which is shaped into a desired shape after the stamping operation. In the process, after the two crimped connections 12.1, 12.2 are established, the first contact-making region 12 is bent such that the individual cores 3, 4 of the connection cable 2 are closer to one another. The relatively large spacing before the crimped connection is established is required since the first connection pieces 12.1, 12.2, which are designed as crimping lugs, are bent out of the material of the stamped strip. In addition, the connection element 10 is bent at the borders of the transition region 14 between the first connect-making region 12 and the second contact-making region 16 such that a sloping plane for bridging the desired height difference between the two contact-making regions 12, 16 is created.

Figure 3:
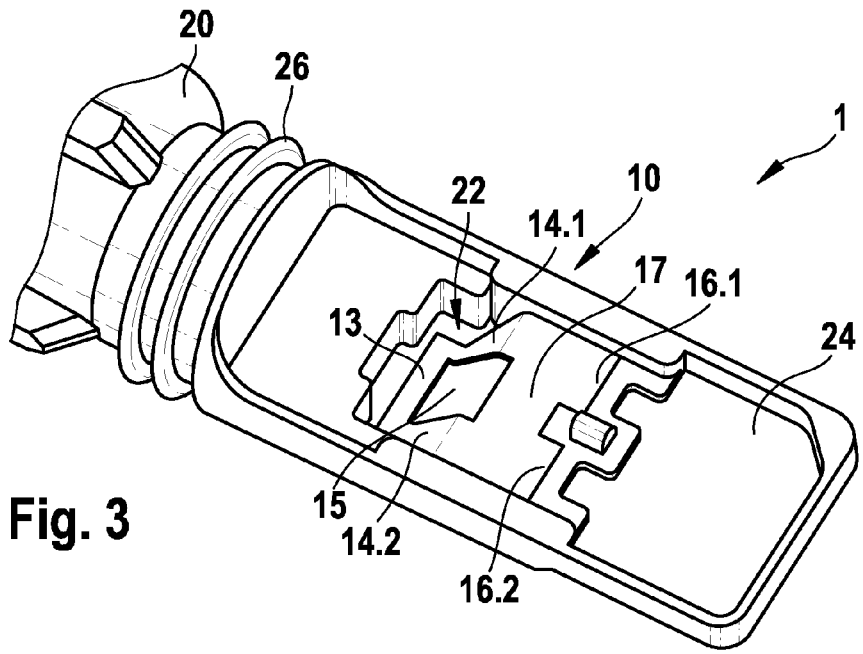
FIG. 3 shows a schematic perspective view of an exemplary embodiment of a connection assembly according to the disclosure for a sensor assembly having a connection element which is designed in accordance with the first exemplary embodiment which is illustrated in FIG. 1 or 2.
Figure 4:
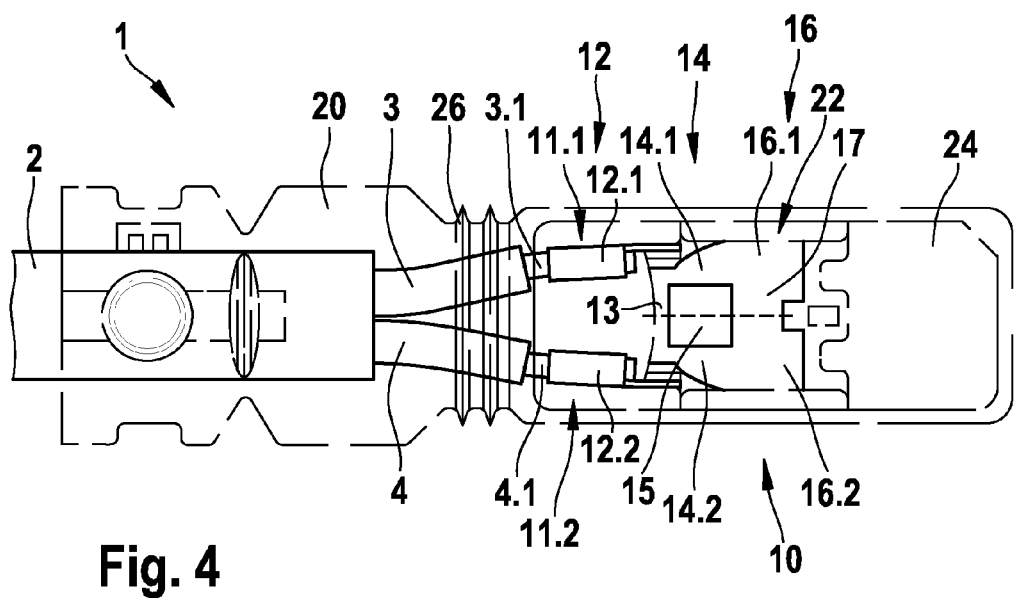
FIG. 4 shows a schematic plan view of the exemplary embodiment, which is illustrated in FIG. 3, of the connection assembly according to the disclosure for a sensor assembly having a plastic casing which is illustrated to be transparent.

As can be seen in FIGS. 3 and 4, the connection element 10 is at least partially encased by a plastic extrusion coating 20 which has a window-like cutout 22 in the transition region 14. The window-like cutout 22 is sealed off during the injection process for the plastic extrusion coating 20 in the injection-molding die in order to prevent overflowing into the region which is to be kept free of plastic. The connection element 10 is positioned in the injection-molding die by means of the positioning opening 15 in the connection element 10. The region which surrounds the positioning opening 15, that is to say the two connecting webs 13, 17 and the two transition webs 14.1, 14.2, is sealed off so that it is flat in the injection-molding die in order to produce the window-like cutout 22. The bends in the first contact-making region 12 for creating the requisite spacing between the two crimped connections 12.1, 12.2 are made outside this sealing region, with the result that the bending regions are arranged within the plastic extrusion coating 20. The first connecting web 13 and the second connecting web 17 are severed after the injection process, this being illustrated by a dashed line in FIG. 4, in order to in each case electrically insulate the two first connection pieces 12.1, 12.2 and the two second connection pieces 16.1, 16.2 from one another in order to create the abovementioned electrically separate signal paths.

The connection assembly 1 according to the disclosure describes a precursor for the production of a sensor assembly, in particular for measuring rotation speeds and/or rotation directions. The connection assembly 1 electrically connects a sensor element (not illustrated) to the connection cable 1 by means of the connection element 10. As can further be seen in FIGS. 3 and 4, the connection assembly 1 has a bearing region 24 for the sensor element (not illustrated) which can be connected to the connection assembly 1, for example by means of a resistance welding process, in a further manufacturing step. In this case, electrical contact is made between the sensor element and the connection assembly 1 by means of the second connection pieces 16.1, 16.2. After connection to the connection assembly 1, the sensor assembly produced is once again extrusion coated with plastic. To this end, the plastic casing 20 of the connection assembly 1 has fusion ribs 26 for secure incorporation in the overall casing. The same polyamide material can be used as the thermoplastic both for the casing 20 and also for the overall casing of the sensor assembly.

Two further exemplary embodiments of a connection element 10', 10" for a connection assembly according to the disclosure for a sensor assembly will be explained below with reference to FIGS. 5 and 6.

Figure 5:
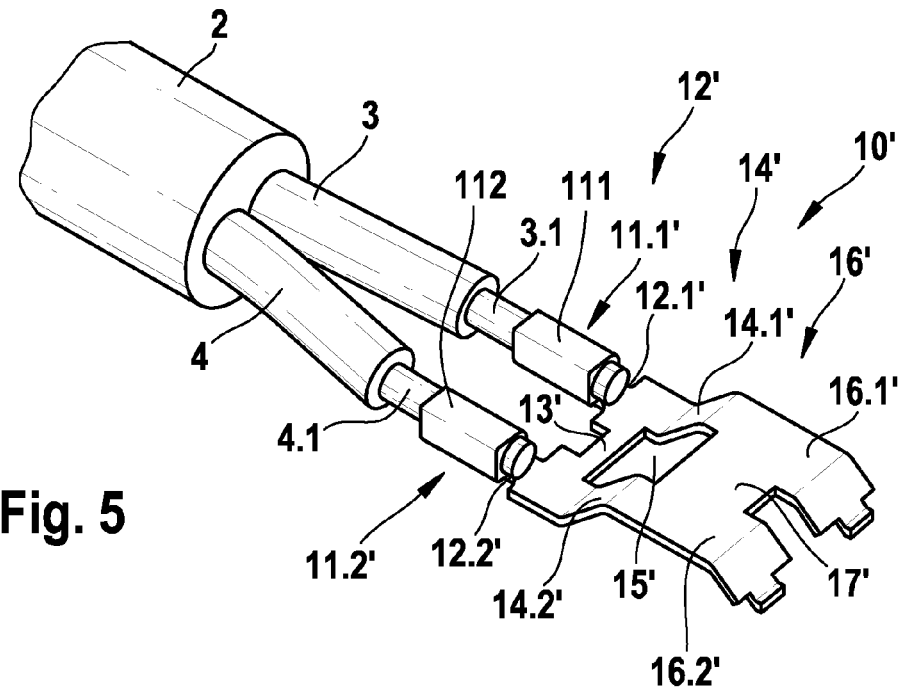
FIG. 5 shows a schematic, perspective view of a second exemplary embodiment of a connection element, which is electrically and mechanically connected to a connection cable, for a connection assembly according to the disclosure for a sensor assembly.

FIG. 5 shows a schematic, perspective view of a second exemplary embodiment of the connection element 10' for a connection assembly according to the disclosure for a sensor assembly. In said figures, FIG. 5 shows the connection element 10' after a double crimped connection 11.1', 11.2' to a two-core connection cable 2 has been established.

As can be seen in FIG. 5, the second exemplary embodiment of the connection element 10', analogously to the first exemplary embodiment, comprises two first connection pieces 12.1', 12.2', which are connected to one another by means of a first connecting web 13', in a first contact-making region 12'. The two first connection pieces 12.1', 12.2' are electrically and mechanically connected in each case to a stripped end 3.1, 4.1 of a core 3, 4 of the connection cable 2 by corresponding crimped connections 11.1', 11.2' in the first contact-making region 12', said crimped connections, in contrast to the first exemplary embodiment, being established by means of additional crimpling elements 111, 112. On account of the use of the additional crimpling elements 111, 112, the two first connection pieces 12.1', 12.2' are already at the desired spacing from one another, without further bending processes, before the two crimped connections 12.1', 12.2' are established. In a second contact-making region 16', the connection element 10' comprises, analogously to the first exemplary embodiment, two second connection pieces 16.1', 16.2' which are connected to one another by means of a second connecting web 17'. In the second contact-making region 16', the two second connection pieces 16.1', 16.2' can be electrically and mechanically connected to a sensor element (not illustrated) in a further manufacturing step. Analogously to the first exemplary embodiment, a positioning opening 15' is arranged in a transition region 14' between the first contact-making region 12' and the second contact-making region 16', said positioning opening being laterally delimited by two transition webs 14.1', 14.2', with a first transition web 14.1' connecting a first connection piece 12.1' to a second connection piece 16.1', and a second transition web 14.2' connecting the other first connection piece 12.2' to the other second connection piece 16.2'. As a result, two separate signal paths by means of which the sensor element (not illustrated) can be electrically coupled to the connection cable 2 can be created by separating the first connecting web 13', which delimits the positioning opening 15' at one end, and the second connecting web 17', which delimits the positioning opening 15' at the other end. Analogously to the first exemplary embodiment, the first contact-making region 12' and the second contact-making region 16' of the connection element 10' are arranged in different planes, with the transition region 14' being designed, in order to bridge the existing height difference, as a sloping plane. The connection element 10' is designed, for example, as a stamped part which is shaped into a desired shape after the stamping operation.

Analogously to the first exemplary embodiment, the connection element 10' is at least partially encased by a plastic extrusion coating which has a window-like cutout in the transition region 14'. Before the injection process, the connection element 10' is bent at the borders of the transition region 14' between the first contact-making region 12' and the second contact-making region 16' such that a sloping plane for bridging the desired height difference between the two contact-making regions 12', 16' is created. The window-like cutout is sealed off during the injection process for the plastic extrusion coating in the injection-molding die in order to prevent overflowing into the region which is to be kept free of plastic. The connection element 10' is positioned in the injection-molding die by means of the positioning opening 15' in the connection element 10'. The region which surrounds the positioning opening 15', that is to say the two connecting webs 13', 17' and the two transition webs 14.1', 14.2', is sealed off so that it is flat in the injection-molding die in order to produce the window-like cutout. The first connecting web 13' and the second connecting web 17' are severed after the injection process in order to in each case electrically insulate the two first connection pieces 12.1', 12.2' and the two second connection pieces 16.1', 16.2' from one another in order to create the abovementioned separate signal paths.

Figure 6:
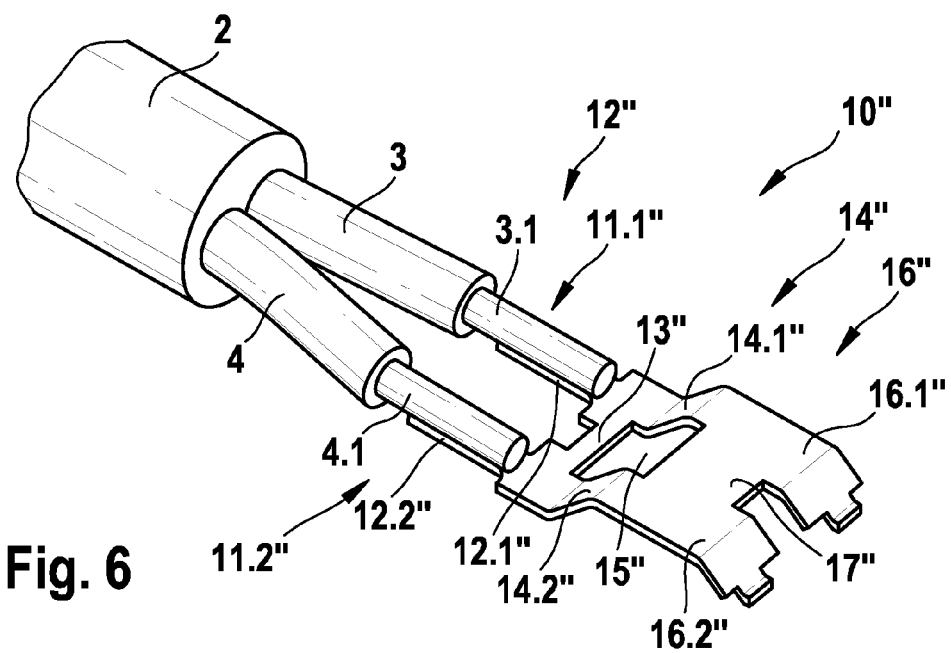
FIG. 6 shows a schematic, perspective view of a third exemplary embodiment of a connection element, which is electrically and mechanically connected to a connection cable, for a connection assembly according to the disclosure for a sensor assembly.

FIG. 6 shows a schematic, perspective view of a third exemplary embodiment of the connection element 10" for a connection assembly according to the disclosure for a sensor assembly. FIG. 6 shows the connection element 10" after a double soldered and/or welded connection 11.1", 11.2" to a two-core connection cable 2 is established.

As can be seen in FIG. 6, the third exemplary embodiment of the connection element 10", analogously to the first and second exemplary embodiments, comprises two first connection pieces 12.1", 12.2", which are connected to one another by means of a first connecting web 13", in a first contact-making region 12". In contrast to the first and second exemplary embodiments, the two first connection pieces 12.1", 12.2" are not in each case electrically and mechanically connected to a stripped end 3.1, 4.1 of a core 3, 4 of the connection cable 2 by crimped connections but rather by soldered and/or welded connections 11.1", 11.2" in the first contact-making region 12". On account of the use of the soldered and/or welded connections 11.1", 11.2", the two first connection pieces 12.1", 12.2" are, analogously to the second exemplary embodiment, already at the desired spacing from one another, without further bending processes, before the two soldered and/or welded connections 11.1", 11.2" are established. In a second contact-making region 16", the connection element 10" comprises, analogously to the first and second exemplary embodiments, two second connection pieces 16.1", 16.2" which are connected to one another by means of a second connecting web 17". In the second contact-making region 16", the two second connection pieces 16.1", 16.2" can be electrically and mechanically connected to a sensor element (not illustrated) in a further manufacturing step.

Analogously to the first and second exemplary embodiments, a positioning opening 15" is arranged in a transition region 14" between the first contact-making region 12" and the second contact-making region 16", said positioning opening being laterally delimited by two transition webs 14.1", 14.2", with a first transition web 14.1" connecting a first connection piece 12.1" to a second connection piece 16.1", and a second transition web 14.2" connecting the other first connection piece 12.2" to the other second connection piece 16.2". As a result, two separate signal paths by means of which the sensor element (not illustrated) can be electrically coupled to the connection cable 2 can be created by separating the first connecting web 13", which delimits the positioning opening 15" at one end, and the second connecting web 17", which delimits the positioning opening 15" at the other end. Analogously to the first and second exemplary embodiments, the first contact-making region 12" and the second contact-making region 16" of the connection element 10" are arranged in different planes, with the transition region 14" being designed, in order to bridge the existing height difference, as a sloping plane. The connection element 10" is designed, for example, as a stamped part which is shaped into a desired shape after the stamping operation.

Analogously to the first and second exemplary embodiments, the connection element 10" is at least partially encased by a plastic extrusion coating which has a window-like cutout in the transition region 14". Before the injection process, the connection element 10" is bent at the borders of the transition region 14" between the first contact-making region 12" and the second contact-making region 16" such that a sloping plane for bridging the desired height difference between the two contact-making regions 12", 16" is created. The window-like cutout is sealed off during the injection process for the plastic extrusion coating in the injection-molding die in order to prevent overflowing into the region which is to be kept free of plastic. The connection element 10" is positioned in the injection-molding die by means of the positioning opening 15" in the connection element 10". The region which surrounds the positioning opening 15", that is to say the two connecting webs 13", 17" and the two transition webs 14.1", 14.2", is sealed off so that it is flat in the injection-molding die in order to produce the window-like cutout. The first connecting web 13" and the second connecting web 17" are severed after the injection process in order to in each case electrically insulate the two first connection pieces 12.1", 12.2" and the two second connection pieces 16.1", 16.2" from one another in order to create the abovementioned separate signal paths.

Embodiments of the disclosure allow for simple positioning of a connection element in the injection-molding die and prevent undesirable overflowing during the injection process. The production of a precursor for manufacturing a sensor assembly, in particular for measuring rotation speeds and/or directions of rotation, is advantageously improved by virtue of a positioning opening and by virtue of a flat sealing off of the region which surrounds the positioning opening in the injection-molding die.

The invention claimed is:

1. A connection assembly for a sensor assembly comprising:
   a connection element electrically and mechanically connected to one end of at least one core of a connection cable in a first contact-making region and configured to be electrically and mechanically connected to a sensor element in a second contact-making region,
   wherein the connection element is at least partially encased by a plastic coating which has a window-like cutout in a transition region between the first contact-making region and the second contact-making region,
   wherein said cutout is sealed off during an injection process for the plastic coating in an injection-molding die,
   wherein a positioning opening is arranged in the transition region such that the connection element is configured to be positioned in the injection-molding die, and
   wherein the transition region, which surrounds the positioning opening, in the injection-molding die for producing the window-like cutout is sealed off.

2. The connection assembly as claimed in claim 1, wherein the first contact-making region and the second contact-making region are arranged in different planes, with the transition region configured, in order to bridge an existing height difference between the first contact-making region and the second contact-making region, as a sloping plane in which two transition webs laterally delimit the positioning opening.

3. Connection assembly as claimed in claim 1, wherein two first connection pieces are arranged in the first contact-making region and connected to each other by a first connecting web that delimits the positioning opening at one end.

4. The connection assembly as claimed in claim 3, wherein:
   a first transition web connects a first of the two first connection pieces to a corresponding first of the two second connection pieces, and
   a second transition web connects a second of the first connection pieces to a corresponding second of the two second connection pieces.

5. The connection assembly as claimed in claim 3, wherein the first connecting web and/or the second connecting web are severed after the injection process in order to separate the two first connection pieces and/or the two second connection pieces from one another.

6. The connection assembly as claimed in claim 3, wherein the electrical and mechanical connection in the first contact-making region between the first connection pieces and in each case one end of a core of the connection cable is made by a crimped connection or a soldered and/or welded connection.

7. The connection assembly as claimed in claim 6, wherein the crimped connection between the first connection pieces and in each case one end of the cores of the connection cable are established by first connection pieces configured as a crimping lug or as additional crimping elements.

8. The connection assembly as claimed in claim 7, wherein the first connection pieces, which are configured as a crimping lug, are bent after the respective crimped connection is established, with the respective bending region being arranged outside the sealing region for producing the window-like cutout.

9. Connection assembly as claimed in claim 1, wherein two second connection pieces are arranged in the second contact-making region and connected to each other by a second connecting web that delimits the positioning opening at one end.

10. A sensor assembly for a vehicle, in particular for establishing a rotation speed and/or direction of rotation, comprising:
   a sensor element, including a connection assembly having a connection element which is electrically and mechanically connected to one end of at least one core of a connection cable in a first contact-making region and can be electrically and mechanically connected to a sensor element in a second contact-making region,
   wherein the connection element is at least partially encased by a plastic coating which has a window-like cutout in a transition region between the first contact-making region and the second contact-making region,
   wherein said cutout is sealed off during the injection process for the plastic coating in the injection-molding die,
   wherein a positioning opening is arranged in the transition region such that the connection element can be positioned in the injection-molding die, and
   wherein the transition region, which surrounds the positioning opening, in the injection-molding die for producing the window-like cutout is sealed off.

* * * * *